H. BUCKINS.
Milk Strainer.
No. 30,046. Patented Sept. 18, 1860.
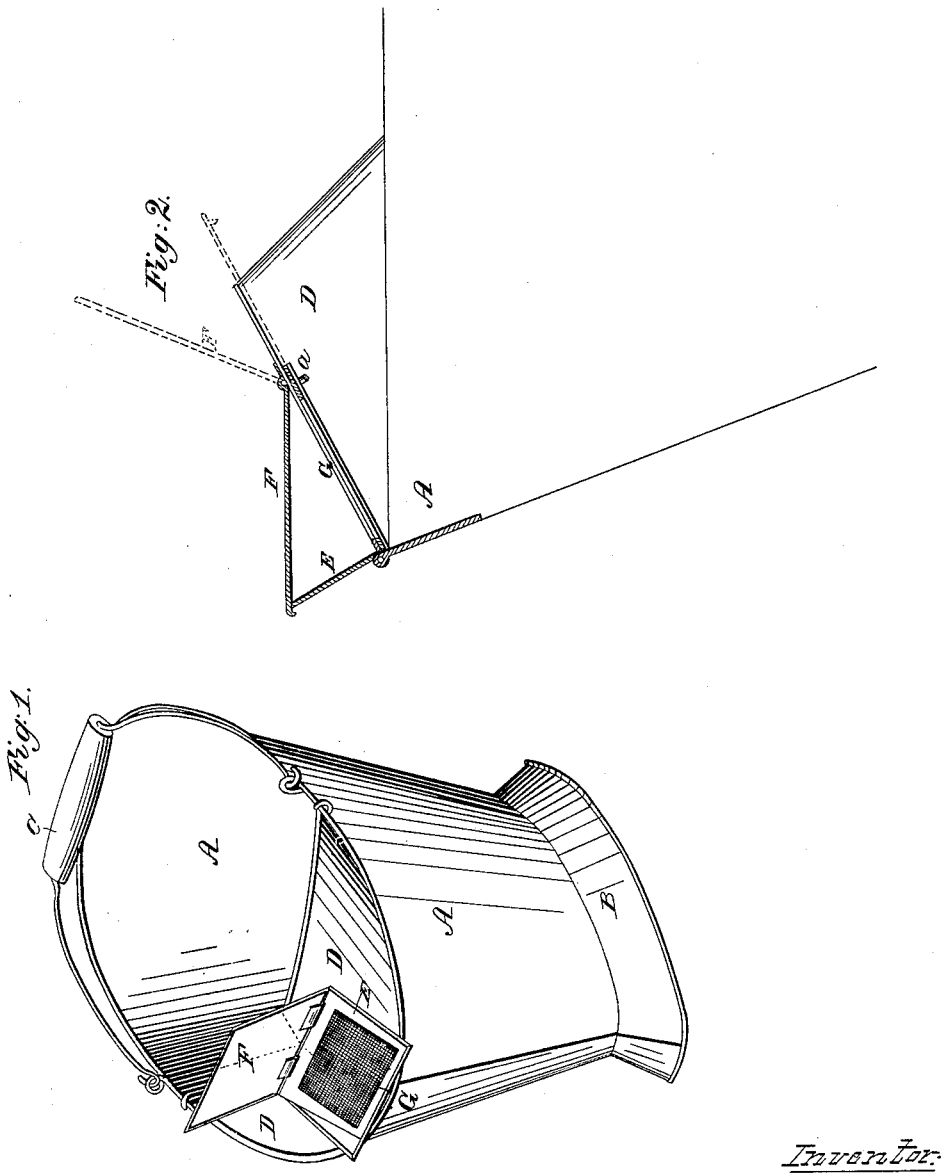

UNITED STATES PATENT OFFICE.

H. BUCKIUS, OF CANTON, OHIO, ASSIGNOR TO HIMSELF AND SAMUEL PETREE.

MILK-STRAINING PAIL.

Specification of Letters Patent No. 30,046, dated September 18, 1860.

*To all whom it may concern:*

Be it known that I, H. BUCKIUS, of Canton, in the county of Stark and State of Ohio, have invented a certain new and useful Improvement in Pails for Straining Milk and other Liquids; and I do hereby declare that the following is a full, clear, and exact description of the same, reference being had to the accompanying drawings, forming a part of this specification, in which—

Figure 1 represents a pail with my improvement applied thereto, the lid or cover F, being raised to show the strainer G, and Fig. 2 represents a section on line A B, Fig. 1, of a detached portion of the pail.

In the drawings, A, represents a tin pail having a flange or bottom B, bail or handle C, guard, shield, or top-piece D, the latter having a spout or discharge channel E, to the top of which is hinged a lid or cover F, while to the under-side of the guard or top piece D, and on each side of the channel or spout F, are grooves between which a strainer G, works.

When the pail is to be used for straining milk or other liquids, the strainer G, is slid down as shown in Figs. 1 and 2, and the lid F, dropped down as shown in Fig. 2. Now as the pail is tipped up, the guard or top piece D, which is securely fastened to the top of the pail, keeps the milk or other liquid from running over the top of the pail while the operation of straining is going on, the lid F, rises freely as the operation proceeds.

The lid F, can be turned back as shown in red lines, Fig. 1, if preferred, although in most cases it will be best to leave it down, since by so doing all danger of dust and dirt getting in upon the strainer from above will be obviated. After the operation of straining is over, the strainer can be easily washed by the water which is put in to wash out the pail, or it can be easily removed from the pail. As a general thing, however, it can be washed sufficiently by simply sliding it up as shown in red lines Fig. 2.

It will thus be seen that by my arrangement and construction of parts, the pail can be used without the strainer, and that too, without entirely detaching the same, all that is necessary being to slide it up as shown in red lines, Fig. 2, and which is easily done by taking hold of a projection $a$, on the top of the strainer, and further, that when used with the strainer, the latter can be easily cleaned and washed in the pail, or it can be entirely removed either to be washed, or to permit of the insertion of a finer or coarser one, as may be desired.

What I claim and desire to secure by Letters Patent, is—

The combination with the pail A, and spout or channel E, of the removable and sliding strainer G, arranged to work up and down on the underside of the guard or top-piece D, as shown and described and for the purposes stated.

In witness whereof I have hereunto subscribed my name.

H. BUCKIUS.

Witnesses:
   PERCY S. SOWERS,
   JOHN DANNES.